United States Patent [19]

Shannon

[11] 4,299,127
[45] Nov. 10, 1981

[54] FLEXIBLE HUB MAGNETIC GYRO WHEEL

[76] Inventor: E. Paul Shannon, Rte. 2, Box 249, Killen, Ala. 35645

[21] Appl. No.: 103,353

[22] Filed: Dec. 13, 1979

[51] Int. Cl.³ .................................. G01C 19/06
[52] U.S. Cl. .................................. 73/504; 74/5 R
[58] Field of Search .......... 73/504; 74/5 F, 5 R, 74/5.6 E

[56] References Cited

U.S. PATENT DOCUMENTS

| | | | |
|---|---|---|---|
| 2,815,584 | 12/1957 | Watson | 73/504 A |
| 2,951,377 | 9/1960 | Lahde | 74/5.6 E |
| 4,147,663 | 4/1979 | Bower et al. | 73/504 |

Primary Examiner—James J. Gill
Attorney, Agent, or Firm—Hugh D. Jaeger

[57] ABSTRACT

Flexible-hub magnetic gyro wheel including a ring member comprising ferromagnetic material or the like and including a plurality of alternating magnetic poles circumferentially spaced about the ring member, a flexible hub affixed to the interior of the ring, and structure rigidly attaching the flexible hub to a drive shaft, such as the shaft of a motor or a shaft driven by a motor or other drive structure. The structure for rigidly attaching the flexible hub to a shaft consists of a set collar and a set washer on opposing sides of the center of the hub material whereby the set collar and set washer support the magnetic gyro wheel on an axially rotating shaft. The magnetic gyro wheel is suitable for use in a rate of turn indicator, a gyro, or other like instrument designed to sense and respond to a rate of turn or angular velocity applied to the instrument at a right angle to the spin axis of the magnetic gyro wheel. The magnetic gyro wheel can comprise one or more rings of magnetic material magnetized with alternating poles with the flexible hub attached thereto or can be fabricated from a plurality of magnets held together in such a way as to achieve the characteristics of the magnetized ring or rings described above. As one alternative the magnetic gyro wheel can also be made of a flexible magnetic material magnetized with alternate magnetic domains on one or both sides of the wheel or upon the periphery of the wheel.

23 Claims, 5 Drawing Figures

FLEXIBLE HUB MAGNETIC GYRO WHEEL

BACKGROUND OF THE INVENTION

1. Field of the Invention

The present invention relates generally to a gyro, and more particularly pertains to a magnetic gyro wheel which incorporates a flexible hub, the hub replacing the normally used gimbal and gimbal bearings for the purpose of allowing the gyro to sense and react to a rate of turn, for use with a rate of turn indicator, a navigational instrument, and, more particularly, as a nautical navigation aid.

2. Description of the Prior Art

Prior art rate of turn indicators have usually consisted of complex gyros having numerous mechanical and electromechanical components. The prior art gyro wheels were comparatively heavy and were meticulously machined from steel or other material such as brass, bronze, lead or other similar material, to a high degree of precision. The wheel was usually an integral part of a motor and because of the high speed required, the motor was usually of the direct current variety with the inherent problems normally associated with brushes and commutators such as burned or stuck brushes, burned, worn, or shorted commutator segments and electrical sparking and arcing. The gyro and motor assembly had to be extremely well balanced dynamically. The need for a constant speed led to complicated and delicate centrifugal-force operated switches that intermittently interrupted or applied electrical power to the motor as needed to maintain a fairly constant speed. The switches were a source of trouble, such as sparking and burning of the switch contacts, wear of critical moving parts, and, along with the brushes, a source of radio interference. It also added to the cost of manufacture. Another serious disadvantage was the fact that power interruptions caused small but sudden changes in the speed of the motor. This speed change caused a noticeable spurious deflection of the indicating device used with the gyro.

Prior art gyro and motor assemblies were mounted in a gimbal ring which permitted one degree of freedom as opposed to a fully gimballed gyro such as is used in a gyro compass. This "one degree of freedom" is the one thing that distinguishes the "rate gyro" from gyros used for other purposes. While a single degree of freedom is attained by the use of a single gimbal mount for the gyro as used in prior art rate of turn indicators thus making an ordinary gyro act as a rate gyro, the gimbal mounting limits the gyro's rate sensing ability to one single axis lying in a single plane. This limitation may be desirable in some cases such as when used for the sensing element of an automatic pilot system for use in rough waters or the like, wherein the gyro may be subjected to rotational forces around several axes at right angles to the gyro spin axis at any given time. The gimbal in this case limits the sensitivity of the gyro to the rotational force acting around a desired reference axis such as a vertical axis through the vessel or other vehicle upon which it is installed. This limitation is neither necessary nor desirable for some other uses of the rate gyro, an example being when used to detect a small rate of turn of a towboat or a ship operating in calm waters.

The gimbal and associated bearings introduced another problem of friction. Any appreciable amount of friction in the gimbal bearings drastically affects the accuracy, sensitivity, and response of the rate of turn indicator. This is especially troublesome in rate of turn indicators used on towboats or on ships when they are being slowly maneuvered in close quarters. Under these conditions a degree of sensitivity, accuracy, and response to very small rates of turn is required that is not encountered in fast, highly maneuverable vehicles such as aircraft and the like.

Another problem with gimballed gyros when used as the sensing element of rate of turn indicators as used in the towboat industry arose from the fact that the instrument is primarily used to help the pilot of the vessel to steer a straight course. Used in this way, the gimbals are nearly always in the zero-rate position and will gradually wear the gimbal bearings in such a way that they will develop some reluctance to move from this position.

This action, however slight, reduces the accuracy of the instrument at or near the zero-rate position and reduces its ability to respond to very small rates of turn. The accuracy of the instrument in the zero-rate area and its ability to respond to extremely low rates of turn are of utmost importance as used on towboats.

Rate of turn information sensed by prior art gyros was usually transmitted to the indicating device such as an electrical meter movement through an electromechanical device attached to the gimbal or through a gear train driven by the gimbal. Both methods introduced an additional amount of friction and further reduced the instrument's ability to respond to a small rate of turn since all friction must be overpowered before the pointer of the indicator can move.

Prior art rate of turn indicators are normally supplied in a package of two or more separate units that are installed by a skilled technician. The units are interconnected by electrical cables and are sometimes remote from each other. In a typical installation the indicator unit would be in the pilot house of a boat. The gyro unit would be located under the pilot house, a storage room, or even, in some cases, the engine room. In some cases an additional motor-generator unit is used to supply the DC power for the gyro unit. This kind of arrangement complicates service problems and increases maintenance cost.

The gimbal in prior art gyros is held in the zero-rate position by a spring or springs when no rate of turn is being sensed and is returned to zero position by the same method after a turn is completed. Spring action is non-linear, and the readout from the gyro unit is inherently non-linear.

Prior art rate of turn indicators are normally based on high-speed, short-lived, aircraft type gyros that for all the reasons heretofore given are, in many respects, unsuitable for use on towboats and ships.

The faults and limitations of prior art rate of turn indicators apply also to the use for which they were designed, for aircraft rate gyros.

The flexible-hub magnetic gyro wheel of the present invention overcomes the disadvantages of the prior art gyros by providing a magnetic gyro wheel in combination with a flexible hub which is least in components, least costly to manufacture, and which is much more accurate in providing gyroscopic information. The flexible hub of the present invention produces a freedom of action around an infinity of axes at right angles to the gyro spin axis, and yet limits the sensitivity to a single plane as does the single gimbal, single-degree-of-freedom rate gyro. The flexible hub makes it possible to select any desired axis lying in a plane at right angles to the spin axis of the gyro simply by positioning the sensing elements (the electric pickup coils) at the proper points around the circumference of the gyro. A plurality of pairs of sensing elements properly positioned would make it possible to electrically select any one of a plurality of axes for examination such as yaw, roll, and pitch. Rates of turn around any one of these axes could be examined individually of their vectorial resultant determined by vectorial addition.

SUMMARY OF THE INVENTION

The present invention provides a magnetic gyro wheel in combination with a flexible hub for a rate of turn indicator or other like gyroscopic instrument.

According to one embodiment of the present invention, there is provided a magnetic gyro wheel including at least one member of ferromagnetic material or the like and including a plurality of alternating magnetic poles disposed about the circumference of the ring member, a hub of flexible material having a rigidity about the axis but being laterally flexible and affixed to the interior of the ring member, and a set washer and a set collar disposed opposite on either side of the hub material on the axis whereby the set washer and set collar axially support the magnetic gyro wheel on a rotating shaft and the hub material provides for lateral movement but rigid flexibleness thereby providing the alternating magnets to induce current in sensors placed adjacent to one side of the wheel and diametrically opposed to each other providing for an indication of angular velocity around an axis at right angles to the spin axis of the gyro wheel.

The flexible hub material can be disposed either between two identical ring members providing for front-to-back balance of the wheel, or in the alternative can be disposed in the middle of one ring member.

A significant aspect and feature of the present invention is a magnetic gyro wheel which provides an indication to adjacent sensors such as two solenoid coils diametrically opposed to each other that the gyro is or is not being subjected to a rotary motion about an axis at right angles to the spin axis of the gyro and if a rotary motion exists, provides a positive or negative voltage output from the sensors, the polarity of which is indicative of the direction, clockwise or counterclockwise, of the rotary motion and the magnitude of which is proportional to the rate in some angular unit per unit of time of the rotary motion.

Another significant aspect and feature of the present invention is to provide a magnetic gyro wheel in combination with a flexible hub which is least mechanically complex in novel significance and which accomplishes an end result having never before been accomplished by the prior art, in that the magnetic gyro wheel rotates at a constant speed and alternately passes magnetic poles before sensors which indicate the magnitude and direction of any angular force that may be acting upon the gyro about an axis at right angles to the gyro driving shaft. The angular force, if one exists, is the vectorial resultant of one or more force vectors which may be acting upon the gyro at any one time.

One of the most important novel aspects and features of the present invention is to provide a magnetic gyro wheel in combination with a flexible hub which is not a part of a motor, but may be firmly affixed to a motor drive shaft or a shaft driven by other external structure and requires no mechanical or electromechanical structure for taking information from the gyro. This eliminates all frictional effects of the gyro itself allowing for very high sensitivity and accuracy without resorting to heavy flywheels operating at very high speeds, and by providing the gyro to operate in a compartment separate from the drive motor, being connected only to the motor drive shaft which minimizes temperature effects from the gyro. The heat generated in the motor by electrical resistance and by friction in the bearings may be dissipated in a compartment separate from the gyro. As a result of the light weight of the wheel and the fact that it is not necessary to drive the gyro at very high speed, it becomes feasible to drive the gyro with a small AC motor which, since the motor is operating under essentially no-load conditions, maintains a speed at or near the synchronous speed of the motor eliminating the need for complicated speed stabilizing devices, thus eliminating the need for additional power supplies such as DC power supplies. All of these features in combination make it possible for the first time to design a small, compact, highly energy-efficient, single-unit rate of turn indicator that is completely self-contained, economical to build, install, operate, and maintain, with superior accuracy, sensitivity, response to very small rates of turn, and an unprecedented ability to return to a true zero reading after a turn is completed.

Having thus described the invention, it is a principal objective hereof to provide a magnetic gyro wheel in combination with a flexible hub.

One objective of the present invention is to provide a magnetic gyro wheel including a flexible hub supporting a plurality of alternating magnetic poles disposed about the circumference of the hub material.

Another objective of the present invention is to provide a magnetic gyro wheel for use in a rate of turn indicator or other like navigational instrument or gyro obviating the need for gimbals and their associated bearings, and the need for mechanical or electromechanical structure for taking information from the gyro.

A further objective of the present invention is to provide a magnetic gyro wheel in combination with a flexible hub which is economical to manufacture and lends itself for easy replacement of existing gyroscopic assemblies.

BRIEF DESCRIPTION OF THE DRAWINGS

Other objects and many of the attendant advantages of this invention will be readily appreciated as the same becomes better understood by reference to the following detailed description when considered in connection with the accompanying drawing, in which like reference numerals designate like parts throughout the FIGURES thereof and wherein.

DESCRIPTION OF THE PREFERRED EMBODIMENTS

Figure 1:
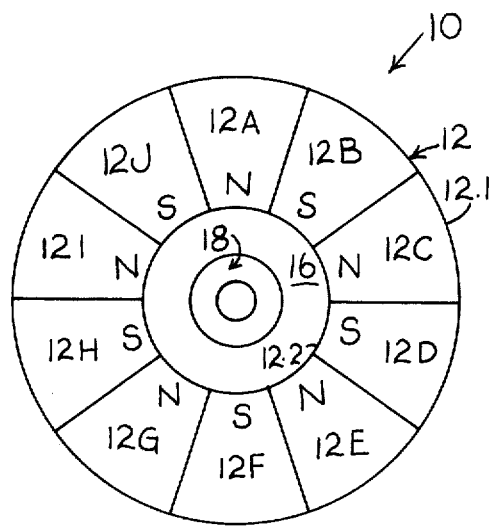
FIG. 1 illustrates a plan view of a flexible-hub magnetic gyro wheel of the present invention.
Figures 2, 3:
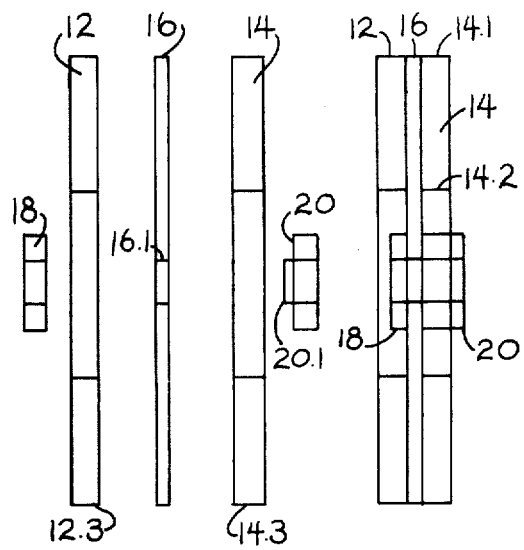
FIG. 2 illustrates an exploded side view of FIG. 1.
FIG. 3 illustrates a side view of FIG. 1.

FIG. 1, which illustrates a plan view of a flexible-hub magnetic gyro wheel 10, the present invention, shows a ring member 12, an opposing ring member 14 as illustrated in FIGS. 2 and 3, and a flexible hub 16 disposed therebetween as illustrated in FIGS. 2 and 3. The ring member has an outer diameter 12.1, an inner diameter 12.2, and a finite width 12.3 as illustrated in FIG. 2. Likewise, ring member 14 has identical outer diameter 14.1, inner diameter 14.2 and finite width 14.3, as illustrated in FIG. 2. The ring member 12 is of ferromagnetic or like material and the ring member 14 can be of identical material or other suitable material. Ring member 14 can be either a magnetized ring member as is ring member 12 or non-magnetized material such as steel to provide fore and aft balance for the ring member 12, providing that the inner and outer diameters are equal. Ring member 12 includes a plurality of alternating magnetic domain poles 12a through 12j, by way of example and for purposes of illustration only, and is not to be construed as limiting of the present invention, magnetized into the ring member 12 as illustrated in dashed lines in FIG. 1. There can be any number of pairs of magnetic poles on the face of the ring magnet 12, or in the alternative, on the periphery of the ring magnet 12. If ring 14 is magnetized as is the ring magnet 12 the poles of the ring magnets 12 and 14 can complement each other. The magnetic domains can take the geometrical shape of a trapezoid, circular, or other predetermined shape as so desired. A hub of flexible material such as fiberglassed mylar, rubber diaphragm material, or other like material, is disposed between ring members 12 and 14 having an outer diameter falling in a range between the diameters of the ring members and having an inner diameter center hole 16.1 which corresponds to the diameter 20.1 of a set collar 20. A set washer 18 and the set collar 20 mount on the sides of the axis of the flexible hub 16 and axially support the magnetic gyro wheel 10 on a motor shaft of a rate of turn indicator or other like instrument. The hub material 16 is secured to the ring members 12 and 14 with any suitable material such as adhesive or the like.

FIG. 2 illustrates an exploded end view of the components of FIG. 1 where all numerals correspond to those elements previously described.

FIG. 3 illustrates an end view of FIG. 1 where all numerals correspond to those elements previously described.

PREFERRED MODE OF OPERATION

The magnetic gyro wheel 10 is positioned on the shaft of a rotating motor of a rate of turn indicator or other gyro type of instrument and the set collar 20 secures the flexible-hub magnetic gyro wheel 10 securely to the shaft of a motor not illustrated in the figure. When the motor attains a predetermined speed, the magnetic gyro wheel 10 axially rotates with the shaft of the motor. During a turn of a vessel or the like, angular vectorial forces cause the magnetic gyro wheel 10 to move with respect to the axis of rotation on account of the lateral flexibility of the flexible hub 16. The flexible hub 16 provides for center flexibility movement consequently causing the alternating magnetic poles or domains to vary their distance from electrical sensing coils not illustrated in the figure and diametrically opposed to the magnetic gyro wheel 10. As a consequence, the magnetic poles on one side of the magnetic gyro wheel 10 move closer to the electromagnetic sensing coil, while the magnetic poles on the other side of the magnetic gyro wheel 10 move away from the electromagnetic sensing coil resulting in a stronger current induced in one of the coils and a weaker current induced in the other coil.

DESCRIPTION OF ANOTHER PREFERRED EMBODIMENT

Figure 4:
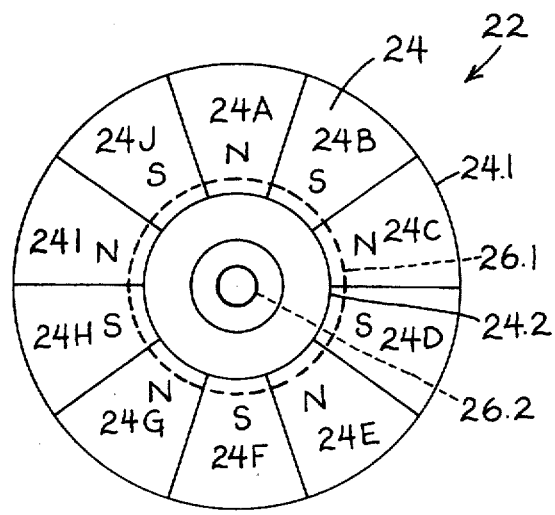
FIG. 4 illustrates a second embodiment of a flexible-hub magnetic gyro wheel; and, FIG. 5 illustrates a side view of FIG. 4.
Figure 5:
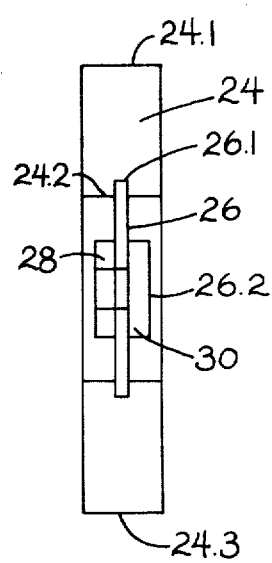

FIG. 4, which illustrates a plan view of a magnetic gyro wheel 22, another embodiment of the present invention, shows a magnetic gyro wheel 22 including a ring member 24 having an outer circumference of 24.1, an inner circumference 24.2, and a finite width of 24.3 as illustrated in FIG. 5. The ring member 24 consists of ferromagnetic material or like magnetic material, and includes a plurality of alternating magnetic poles 24a through 24j, by way of example and for purposes of illustration only and not construed as being limiting of the present invention, alternating about the circumference of the ring 24 and extending therethrough the finite width 24.3. A hub of flexible material 26 having an outer diameter of 26.1, inner diameter of 26.2 affixes in the center of the ring member 24 and being disposed therein as illustrated in FIG. 5. A set washer 28 and a set collar 30 mount on opposing sides of the hub 26 about the axis 26a of the hub material 26.

The mode of operation of the magnetic gyro wheel 22 is identical to that as previously described for the magnetic gyro wheel 10, and for sake of brevity is not repeated.

Various modifications can be made to the magnetic gyro wheels of the present invention without departing from the apparent scope of the present invention.

Having thus described the invention, which is claimed as new and it is desired to be secured by Letters Patent, it is claimed that:

1. Flexible-hub magnetic gyro wheel for use on an axial shaft of a rate of turn indicator comprising:
   a. ring member of ferromagnetic material having an inner diameter and an outer diameter and including alternating magnetic poles equally spaced about said ring member;
   b. circular flexible hub of rubber diaphragm material including a center hole and having an outer diameter of a dimension between said inner and outer diameter of said ring member and affixed thereto, said rubber diaphragm material exhibiting lateral flexibility;
   c. ring of steel material having an inner and outer diameter equal to said diameters of said ferromagnetic ring affixed to said rubber diaphragm material; and,
   d. set collar and opposing washer affixed through said hole of said flexible hub whereby said ring member induces currents in adjacent sensing means of said rate of turn indicator, said flexible hub exhibits gyro properties about said shaft, and said steel ring enhances fore and aft balance and magnetic fields forward of the steel ring and decreases magnetic fields rearward of said steel ring thereby providing a flexible-hub magnetic gyro wheel for said rate of turn indicator.

2. Flexible-hub magnetic gyro wheel of claim 1 wherein said material is flexible and nonstretchable whereby said material being flexible and nonstretchable provides that said flexible hub magnetic gyro wheel can tilt about a central axis in assuming different angular positions with respect to said axis and restraining mass of said wheel in directions outward of said axis thereby maintaining mechanical balance of said flexible-hub magnetic gyro wheel.

3. Flexible-hub magnetic gyro wheel of claim 1 wherein said flexible-hub material provides for said wheel assuming different angular positions with respect to an axis of said wheel.

4. Flexible-hub magnetic gyro wheel for use on an axial shaft of a rate of turn indicator comprising:
  a. ring member of ferromagnetic material having an inner diameter and an outer diameter and including a plurality of alternating magnetic poles equally spaced about the ring member;
  b. circular flexible hub of diaphragm material including a center hole and having an outer diameter of a dimension between said inner and outer diameter of said ring member and affixed thereto, said diaphragm material exhibiting lateral flexibility;
  c. ring of material having an inner and outer diameter equal to said diameters of said ferromagnetic ring affixed to said diaphragm material; and,
  d. set collar and opposing washer affixed through said hole of said flexible hub whereby said ring member induces currents in adjacent sensing means of said rate of turn indicator, said flexible hub exhibits gyro properties about said shaft, and said ring enhances fore and aft balance and magnetic fields forward of said ring and decreases magnetic fields rearward of said ring thereby providing a flexible-hub magnetic gyro wheel.

5. Flexible-hub magnetic gyro wheel of claim 4 further comprising said set collar and set washer disposed on opposite sides of said hub material and about an axis of said hub material whereby set collar and set washer provide mounting of said magnetic gyro wheel on said axially rotating shaft.

6. Flexible-hub magnetic gyro wheel of claim 4 wherein said flexible hub material is rubber diaphragm material.

7. Flexible-hub magnetic gyro wheel of claim 4 wherein said flexible hub is fiberglassed mylar.

8. Flexible-hub magnetic gyro wheel of claim 4 comprising an opposing ring of like material geometrically opposing said magnetized ring material and secured to said hub material.

9. Flexible-hub magnetic gyro wheel of claim 8 wherein said ring material is steel.

10. Flexible-hub magnetic gyro wheel of claim 9 wherein said steel ring is substantially equal in outer diameter size to said ferromagnetic ring member and of a width to substantially equal in weight said ferromagnetic ring member, thereby providing fore and aft balance.

11. Flexible-hub magnetic gyro wheel of claim 4 wherein said opposing ring of like material is an unmagnetized dead ferromagnetic material.

12. Flexible-hub magnetic gyro wheel of claim 4 wherein said opposing ring member is a magnetized ring of ferromagnetic material whereby the magnetic domains complement each other.

13. Flexible-hub magnetic gyro wheel of claim 12 wherein said two rings of material comprise a single integral ring member and said diaphragm material is centrally disposed therein.

14. Flexible-hub magnetic gyro wheel of claim 12 wherein said complementary magnetic domains are equal in number to said magnetic domains of said ring member.

15. Flexible-hub magnetic gyro wheel of claim 4 wherein said plurality of poles comprises ten.

16. Flexible-hub magnetic gyro wheel of claim 4 wherein said ring of material substantially opposes and aligns with said ferromagnetic ring member.

17. Flexible-hub magnetic gyro wheel of claim 4 wherein said material exhibits lateral flexibility but rigid stiffness and is centrally and axially disposed and secured to said ring member.

18. Flexible-hub magnetic gyro wheel of claim 4 wherein said diaphragm material is rubber impregnated nylon mesh.

19. Flexible-hub magnetic gyro wheel of claim 4 wherein said material is flexible and nonstretchable whereby said material being flexible and nonstretchable provides that said flexible-hub magnetic gyro wheel can tilt about a central axis in assuming different angular positions with respect to said axis and restraining mass of said wheel in directions outward of said axis thereby maintaining mechanical balance of said flexible-hub magnetic gyro wheel.

20. Flexible-hub magnetic gyro wheel of claim 4 wherein said flexible-hub material provides for said wheel assuming different angular positions with respect to an axis of said wheel.

21. Flexible-hub magnetic gyro wheel for use on an axial rotating shaft of a rate of turn indicator having sensors for indicating deviation from a predetermined course comprising:
  a. ring member of ferromagnetic material having an inner diameter and an outer diameter and including a plurality of alternating magnetic pole pairs equally spaced about said ring member;
  b. circular flexible hub of diaphragm material including a center hole and having an outer diameter of a dimension between said inner and outer diameter of said ring member and affixed and secured thereto, said diaphragm material exhibiting lateral flexibility and rigid stiffness;
  c. steel ring including an inner and outer diameter substantially equal to said diameters of said ferromagnetic ring, being of substantially equal weight and affixed to said diaphragm material opposing said ferromagnetic ring; and,
  d. set collar and opposing washer affixed through said hole of said flexible hub and secured thereto whereby said ring member of ferromagnetic material induces currents in said sensors of said rate of turn indicator, said flexible hub exhibits gyro properties about said shaft, and said steel ring enhances fore and aft balance and magnetic fields forward of said ring and decreases magnetic fields rearward of said ring thereby providing a flexible-hub magnetic gyro wheel.

22. Flexible-hub magnetic gyro wheel of claim 21 wherein said material is flexible and nonstretchable whereby said material being flexible and nonstretchable provides that said flexible-hub magnetic gyro wheel can tilt about a central axis in assuming different angular positions with respect to said axis and restraining mass of said wheel in directions outward of said axis thereby maintaining mechanical balance of said flexible-hub magnetic gyro wheel.

23. Flexible-hub magnetic gyro wheel of claim 21 wherein said flexible-hub material provides for said wheel assuming different angular positions with respect to an axis of said wheel.

* * * * *